July 10, 1928.
E. C. FRITTS
1,676,542
MOTION PICTURE PROJECTOR
Filed Nov. 14, 1925
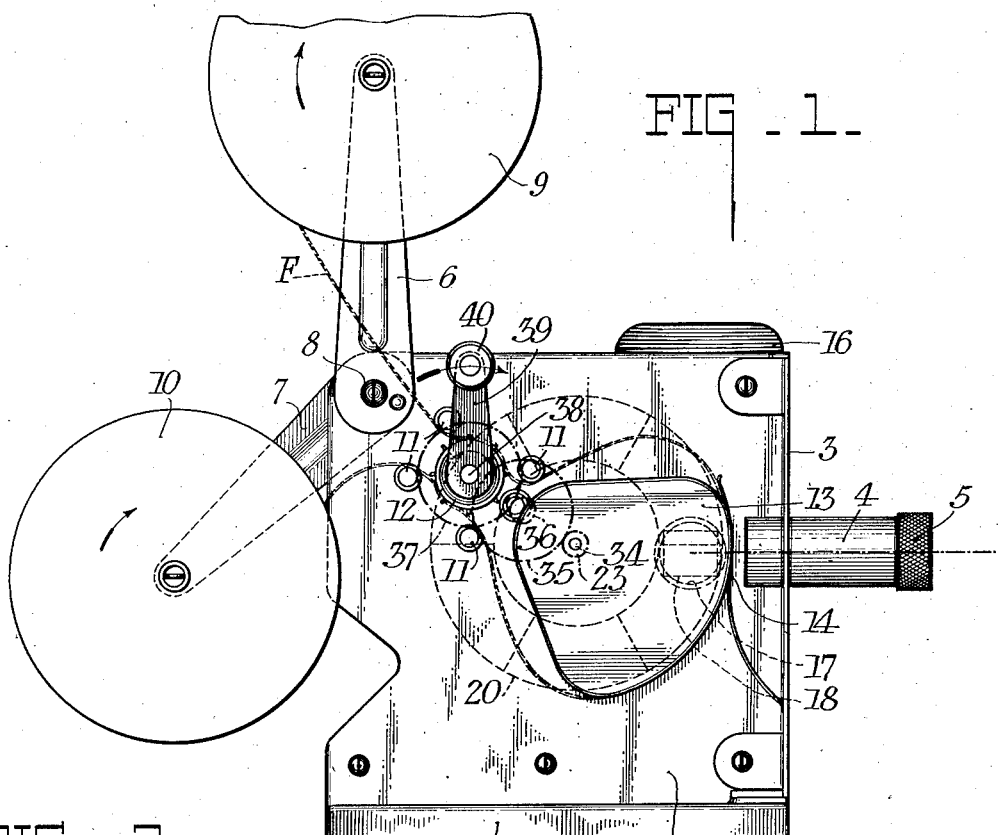
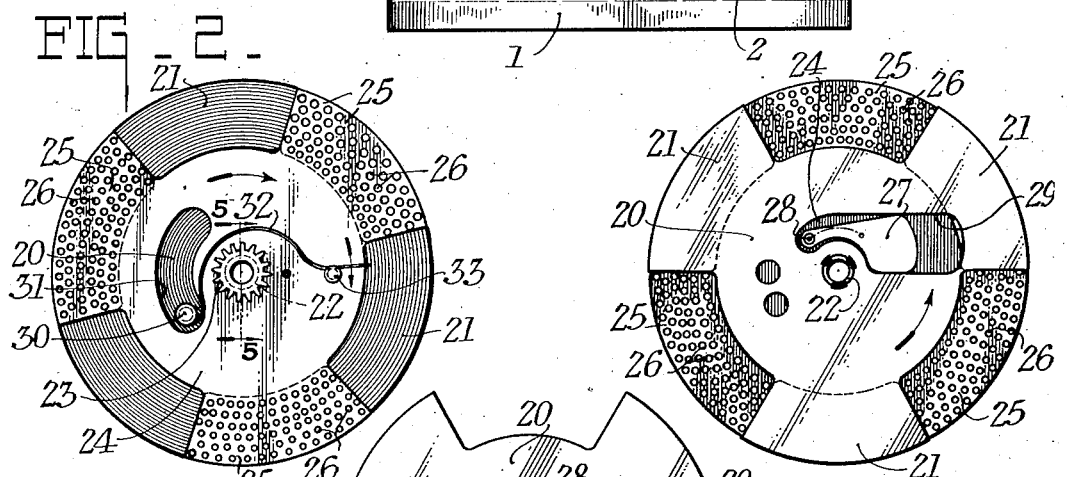
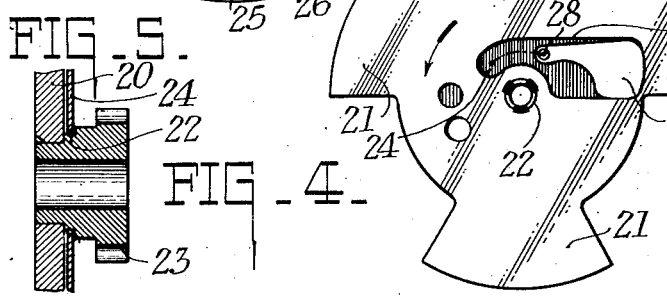
INVENTOR,
Edwin C. Fritts,
BY
ATTORNEYS.

Patented July 10, 1928.

1,676,542

UNITED STATES PATENT OFFICE.

EDWIN C. FRITTS, OF ROCHESTER, NEW YORK, ASSIGNOR TO EASTMAN KODAK COMPANY, OF ROCHESTER, NEW YORK, A CORPORATION OF NEW YORK.

MOTION-PICTURE PROJECTOR.

Application filed November 14, 1925. Serial No. 69,142.

This invention relates to photography, and more particularly to projection machines of relatively simple type designed primarily for home use. One object of my invention is to provide a safety shutter which automatically remains in an operative position when the projector parts are at rest, and one which will be automatically opened when the projector is moved at a predetermined speed. Another object is to provide a safety shutter mounted axially of the projection shutter, the two shutters being of substantially the same shape. Another object is to provide shutters of a complementary shape so that they may together form a disc when in an operative position and when in an inoperative position the plates of the shutter may telescope to provide light openings of the usual type. Another object is to mount the shutters in such a manner that the inertia of the parts will assist in moving the safety shutter to its inoperative position in starting the projector and to its operative position in stopping the projector. Another object of my invention is to provide suitable connections between the two shutters to limit their relative movement and which will also tend to retain the safety shutter in an inoperative position with respect to the projection shutter when the parts are rapidly rotated. Another object of my invention is to provide a safety shutter mechanism which may be very rapidly operated by suddenly starting or stopping the parts of the projector. Another object of my invention is to provide a safety shutter, which, while preventing heat rays from burning the film, may permit sufficient light rays to pass to project still pictures without damaging the film; and other objects will appear from the following specification, the novel features being pointed out in the claims at the end thereof.

Coming now to the drawings wherein like reference characters denote like parts throughout:

Fig. 1 is a side elevation of a typical projector constructed in accordance with and illustrating one embodiment of my invention.

Fig. 2 is a side elevation of one side of the shutter, equipped with my safety device, removed from the projector.

Fig. 3 is an elevation of the reverse side of the shutter from that shown in Fig. 2, the parts being in a safety position, Fig. 4 is a view similar to Fig. 3 but with the parts in another position; and Fig. 5 is an enlarged fragmentary section on line 5—5 of Fig. 2.

As a preferred embodiment of my invention, I have illustrated a simple type of projector which may comprise a base 1, a pair of spaced supporting plates 2 (only one being shown in the drawing), which are adapted to carry the projector mechanism. There is a front flange 3 which may carry a tubular housing 4 in which there is an objective which may be focused by turning the knurled member 5. In the upper corner of plates 2, a pair of arms 6 and 7 are hinged upon a stud 8, these arms carrying a supply reel 9 and a take-up reel 10. A film F may be drawn from reel 9 and passed beneath the idler rollers 11 over a driven sprocket 12 about a housing 13 and through the gate 14. From this gate the film again passes over this sprocket 12 behind the idlers 11 and then to the take-up reel 10. Light is passed from a suitable lamp house 16 through opening 17 in the plates 2 after which it is reflected by a mirror 18 through the film held at the gate 14. Suitable condensers, of course, may be used.

Coming now to my invention, the shutter mechanism consists of a projector shutter 20 provided with three blades 21. To shutter 20 is attached a tubular shaft 22 which terminates in a gear 23. The gear 23, through the gear train 35, 36 and 37, may be driven by means of the shaft 38 which also carries the sprocket 12. Shaft 38 carries a crank 39 and a handle 40. In the illustrated projector the parts are manually driven.

The sleeve shaft 22 is mounted upon a shaft 34, so that the shutters may be rotated by turning handle 40. Sleeve shaft 22 carries a safety shutter 24 which is complementary in shape to shutter 20, being provided with three blades 25, each of which is perforated at 26. As best shown in Fig. 5, shutter 24 may turn upon the sleeve shaft 22. The movement of shutter 24, relative to shutter 20, is defined by a weight 27 pivoted at 28 to shutter 24, and being adapted to move in the weight guideway 29 which is cut in shutter 20. When the weight is in the position shown in Fig. 3, shutter 24 is in its operative position, in which the blades 25 lie between the blades 21 of shutter 20.

A light spring 32 carried by a stud 30 on shutter 20 by pressing on a pin 33 carried by the safety shutter tends to hold the parts in the position shown in Figs. 2 and 3. Pin 30 may move through slot 31 in the safety shutter 24 when the shutters are relatively moved. The inoperative position of the safety shutter is shown in Fig. 4, in which position the weight 27 lies in the end of the guideway 29. This position may be reached by operating the projector parts in either of the two following ways. First, the handle 40 may be slowly turned and gradually brought up to the normal projection speed. When turned in this manner the two shutters will turn together and shutter 24 will remain in its operative position until the projector parts nearly reach their normal projection speed, at which time the weight 27, assisted by the inertia of the safety shutter, will cause the parts to slowly assume the inoperative overlapping position shown in Fig. 4. Second, handle 40 may be suddenly turned so that the acceleration of the shutter 20 will permit the shutter 24 to immediately lag behind and the weight 27 to immediately move through its guideway 29 so that projection may commence at once. If operated in this manner a very few frames of pictures are lost.

In a similar manner the closing of the safety shutter to its operative position as projection ceases may also be accomplished either slowly or quickly. Where the handle 40 is gradually turned at a reduced speed, the spring 32, assisted by the momentum of the shutter 24, closes the safety shutter. If, however, the handle 40 is stopped comparatively suddenly, as for instance in a single revolution, the sudden stopping of shutter 20 will cause the shutter 24 to quickly assume its operative position. This is a very useful feature because it is sometimes desirable to stop suddenly to show a "still" picture.

To show stills, it is necessary to turn handle 40 until a perforated blade 25 lies in the light path. The perforations 26 are of sufficient size and are spaced apart so that sufficient light rays are passed to project a satisfactory still picture. There is, however, sufficient metal lying in the path of the light rays to dissipate enough heat rays to protect the stationary film from burning or being otherwise spoiled by heat.

In the preferred illustrated form of my invention, the main shutter 20 is of relatively heavy metal since this serves to steady hand operation of the moving parts. The safety shutter 24 may be of relatively light metal and the weight 27 is preferably of the same thickness as the main shutter, since this permits a compact arrangement. By assembling the main and safety shutters together, these parts may be made to function properly before inserting into the projector.

With the structure above described the action of the safety shutter is entirely automatic. Since in both starting and stopping the inertia of the parts materially assisted in causing the opening and closing of the safety shutter, it is not necessary to depend entirely upon the weight 27 as a centrifugal safety shutter actuating member for opening the shutters for projection nor upon the spring 32 as the sole means for closing the safety shutter.

Having thus described my invention, what I claim as new and desire to secure by Letters Patent is:

1. In a motion picture projector, the combination with a blade shutter, of a safety shutter adapted to cooperate therewith, the two shutters being movably mounted with respect to each other, means including a weight on one shutter and a guideway for the weight on the other shutter for defining the movement of one shutter relative to the other.

2. In a motion picture projector, the combination with a blade shutter, of a safety shutter adapted to cooperate therewith, a shaft for supporting one shutter, the other shutter being adapted to turn axially of the shaft with respect to the first shutter, a spring tending to hold the two shutters in a fixed relation and a weight operable by centrifugal force adapted to hold the shutters in another position with respect to each other, said weight being carried by one shutter and having a slidable engagement with the other shutter.

3. In a motion picture projector, the combination with a shutter having blades, of a safety shutter having blades, the two shutters being mounted axially of each other and being movable with respect to each other, means for limiting the movement of one shutter relative to the other including a weight and a weight guideway, said weight being pivotally attached to a shutter and being adapted to be moved by centrifugal force to a position in which the shutters are in a projecting position.

4. In a motion picture projector, the combination with a pair of axially mounted shutters of similar shape, and each having a plurality of shutter blades, of means for causing the blades to overlap including a centrifugal governor, the governor being attached to one shutter and having a slidable connection with the other, whereby the two shutters may be overlapped.

5. In a picture projector, the combination with a shutter member made of relatively heavy metal having a guideway therein, a second shutter of relatively light metal, a weighted member carried by the light weight shutter and adapted to move in the guideway in the heavy shutter, and a spring for normally holding the shutters in a predetermined relation, means for moving the shutters from this position including a weight adapted to be actuated by centrifugal force when the shutters are rotated.

6. In a picture projecting machine, including a source of light, an optical system and a film gate, the combination of a heat dispersing shutter comprising a plurality of foraminous blades, a shaft upon which this shutter is mounted, a second shutter of similar shape to the first mentioned shutter, a sleeve shaft upon which the second shutter is mounted, means for normally holding the shutters with their blades spaced to intercept the light beam whereby a still picture may be safely projected, a light beam passing through a foraminous blade, means for overcoming the shutter holding means by rotating the shutters, and controlling means for altering the relative position of the two shutters whereby motion pictures may be projected by causing the rotating means to turn the shutter and to actuate the control member whereby the blades of the two shutters may be made to overlap.

7. In a projector, the combination with a main shutter, of means for rotating the main shutter, a supplementary shutter mounted to turn relative to the main shutter, each of the shutters having blades, the blades of the supplementary shutter being of foraminous material, means to rotate the shutters with their blades in overlapping relation for projecting motion pictures and means for projecting stills through a foraminous blade.

8. In a projector the combination with a main blade shutter, of a complementary blade shutter, a shaft for supporting the main shutter, the complementary shutter being mounted axially of the shaft and being adapted to move relative to the main shutter, a foraminous blade on the complementary shutter, and means for rotating the two shutters with their respective blades separated for protecting a film and with their blades in overlapping relation for projecting motion pictures, said means being also adapted to stop the motion of the shutters and to position the foraminous blade for projecting still pictures.

Signed at Rochester, New York, this 10th day of November, 1925.

EDWIN C. FRITTS.